(12) United States Patent
Guglielmetti et al.

(10) Patent No.: US 12,290,878 B2
(45) Date of Patent: May 6, 2025

(54) CHARACTERIZATION METHOD AND SYSTEM FOR A LASER PROCESSING MACHINE WITH A MOVING SHEET OR WEB

(71) Applicant: BOBST MEX SA, Mex (CH)

(72) Inventors: Philippe Guglielmetti, Crissier (CH); Paul Piron, Crissier (CH)

(73) Assignee: BOBST MEX SA, Mex (CH)

( * ) Notice: Subject to any disclaimer, the term of this patent is extended or adjusted under 35 U.S.C. 154(b) by 904 days.

(21) Appl. No.: 17/593,320

(22) PCT Filed: Mar. 18, 2020

(86) PCT No.: PCT/EP2020/025135
§ 371 (c)(1),
(2) Date: Sep. 15, 2021

(87) PCT Pub. No.: WO2020/187453
PCT Pub. Date: Sep. 24, 2020

(65) Prior Publication Data
US 2022/0176493 A1    Jun. 9, 2022

(30) Foreign Application Priority Data

Mar. 20, 2019 (EP) .................................... 19020135

(51) Int. Cl.
*B23K 26/30* (2014.01)
*B23K 26/03* (2006.01)
(Continued)

(52) U.S. Cl.
CPC .......... *B23K 26/355* (2018.08); *B23K 26/032* (2013.01); *B23K 26/04* (2013.01);
(Continued)

(58) Field of Classification Search
None
See application file for complete search history.

(56) References Cited

U.S. PATENT DOCUMENTS

| | | |
|---|---|---|
| 5,832,415 A | 11/1998 | Wilkening et al. |
| 2008/0223834 A1* | 9/2008 | Griffiths ................. A01K 43/10 219/121.68 |

(Continued)

FOREIGN PATENT DOCUMENTS

| | | |
|---|---|---|
| CN | 103079746 A | 5/2013 |
| CN | 104245332 A | 12/2014 |

(Continued)

OTHER PUBLICATIONS

Machine translation of KR 20130049375-A, Oct. 2024 (Year: 2024).*

(Continued)

*Primary Examiner* — Geoffrey S Evans
(74) *Attorney, Agent, or Firm* — Bookoff McAndrews, PLLC

(57) ABSTRACT

The present invention discloses a method to calibrate a laser cutting machine without stopping the production. The method is adapted to laser cutting machine which use a conveyor belt to convey the sheets while cutting them with the laser. The method allows to place calibration marks at locations on the sheet that are convenient according to the production job, thereby minimising the waste of material.

12 Claims, 7 Drawing Sheets

(51) Int. Cl.
*B23K 26/04* (2014.01)
*B23K 26/08* (2014.01)
*B23K 26/082* (2014.01)
*B23K 26/352* (2014.01)
*B23K 101/16* (2006.01)
*B23K 101/18* (2006.01)

(52) U.S. Cl.
CPC ........ *B23K 26/082* (2015.10); *B23K 26/0846* (2013.01); *B23K 2101/16* (2018.08); *B23K 2101/18* (2018.08)

(56) References Cited

U.S. PATENT DOCUMENTS

| | | | | |
|---|---|---|---|---|
| 2009/0078687 | A1* | 3/2009 | Idaka | B23K 26/082 219/121.68 |
| 2015/0352664 | A1* | 12/2015 | Errico | B23K 26/032 219/121.76 |
| 2016/0180515 | A1 | 6/2016 | Seo et al. | |
| 2019/0163074 | A1* | 5/2019 | Lan | G03F 7/70591 |

FOREIGN PATENT DOCUMENTS

| | | | | |
|---|---|---|---|---|
| CN | 105320399 | A | | 2/2016 |
| CN | 105377501 | A | | 3/2016 |
| CN | 108406096 | A | | 8/2018 |
| CN | 108568593 | A | | 9/2018 |
| CN | 109283542 | A | | 1/2019 |
| JP | 2009220118 | A | | 10/2009 |
| JP | 2011045908 | A | * | 3/2011 |
| KR | 20130049375 | A | * | 5/2013 |
| TW | 201707825 | A | | 3/2017 |
| WO | WO-2007104854 | A2 | * | 9/2007 ........... B23K 26/032 |
| WO | 2013156664 | A1 | | 10/2013 |

OTHER PUBLICATIONS

Machine translation of WO-2007104854-A2, Oct. 2024 (Year: 2024).*
Machine translation of JP-2011045908-A, Oct. 2024 (Year: 2024).*
International Search Report issued Jul. 31, 2020 in corresponding International Application No. PCT/EP2020/025135 (3 pages).

* cited by examiner

CHARACTERIZATION METHOD AND SYSTEM FOR A LASER PROCESSING MACHINE WITH A MOVING SHEET OR WEB

CROSS REFERENCE TO RELATED APPLICATION(S)

This application is a National Stage under 35 U.S.C. § 371 of International Application No. PCT/EP2020/025135, filed Mar. 18, 2020, which claims priority to European Patent Application No. 19020135.0, filed Mar. 20, 2019.

FIELD OF THE INVENTION

This invention is about a method for characterizing and calibrating a laser processing machine with a moving sheet or web or material and about the laser processing machine implementing said method.

TECHNICAL BACKGROUND

Laser cutting machines can be used with all sorts of materials, for example paper, metal, wood or plastic.

A laser processing machine directs a laser beam toward the sheet of material to be processed, with the appropriate focus, power and pulse duration, to either mark, crease or cut the sheet. The laser is positioned either by transporting the laser source on an X-Y translation table, or by deviating a laser beam along two dimensions by using one or two inclinable mirrors. In the latter case, the focus of the laser is sometimes adapted because the distance from the laser source to the processing point of the sheet varies. The laser processing machine can process the sheet located in the field of view of the Laser.

Because of environmental changes, like temperature or humidity variations, the real location where the processing occurs on the sheet varies for the same input signal to the laser system. Thus, to obtain good precision, the laser processing machine must be calibrated.

An uncalibrated machine takes a nominal signal at the input, which corresponds to a nominal location in the working area (surface) of the machine. When processing the sheet with said signal, the cutting/marking of the sheet occurs at a processing location in the working area, which differs from the nominal location. The calibration computes the correction to be applied to the nominal signal so that the cutting/marking of the sheet occurs at the nominal location; in other words, the calibration ensures that the processing location coincides with the nominal location. The calibration of the machine must be performed periodically, as soon as the nominal and processing locations start to drift by more than a fraction of the precision specification of the machine. A characterization differs from the calibration in the sense that the characterization only measures how much the machine differs from a perfectly calibrated machine, but does not compute any corrections for compensating this difference. For example, the characterization of the machine may measure the distance between the set of nominal locations and the set of processing locations.

A method to calibrate the laser processing machine consists in placing a sheet covering the working area of the machine, mark (or cut) the sheet at a set of nominal locations and measure the processing position of said marks on the sheet. Then, compute the set of correction signals to be applied for each nominal location of the set. The correction for an arbitrary (nominal) location in the working area is obtained by interpolation from the set of corrections. For practical reasons, the measurement or the processed location is performed off-line, by taking the processed sheet out of the machine into a measurement device, as disclosed in U.S. Pat. No. 5,832,415. This creates an interruption in the use of the machine, requires an off-line measurement device, and requires the assistance of an operator.

SUMMARY OF THE INVENTION

The invention is about a method for characterizing a laser processing machine. It is also about a method to calibrate the laser processing machine, and about the laser processing machine that implements any of these methods.

The invention is suitable for machine that process individual sheets of material as well as web of material (It could even be a machine that inputs a web or material and outputs sheets materials or sheets of materials with a special shape). We refer to a medium to designate the sheet or the web or material.

This invention is suitable for a processing machine that processes a medium while the medium moves across the working area of the machine.

To characterize the machine, the method moves a medium along the height of the working area of the machine, processes a set of marks on the medium with the laser system according to a set of nominal locations and records each individual mark using a camera. The process of marking (processing) the medium is synchronized with the motion of the medium. The marks are spread on the medium such that each recorded mark can be traced back to the processing location where it was processed. The spatial configuration of the marks is chosen by synchronizing the motion operation and the processing operation. For example, the marks can be positioned so that they span a smaller area on the medium than in the working area.

The synchronized processing and moving of the medium has several advantages. It results in a set of marks on the medium that exhibits a different geometrical configuration than the set of processing locations in the working area. This allows choosing the marking locations on the medium while distributing the processing locations according to calibration/characterization constraints. For example, the marking can be performed in parts of the medium that are destined for waste (which is job dependent). It may also be performed using only on a small portion of the medium, for example a strip in the front or in the back of a sheet of material. Also, the characterization/calibration can be performed in-line without stopping the production—since it can be performed on an unused portion of the medium, provided that some cameras are placed downstream from the working area in the machine. Finally, it jointly characterizes and compensates the defects of the motion apparatus of the machine (the one that moves the medium) and the errors in the processing position of the laser.

For example, the marks can be located in a rectangular area on the medium. The height of the rectangular area can be made smaller than the height of the (smallest) rectangular area covering the set of processing locations in the working area.

To calibrate the laser processing machine, the method computes back the processing location of each individual mark (for example in the working area coordinate frame) from its camera reading and from the motion of the medium. This results in a set of processing locations that are compared to their respective nominal locations to produce the geometric calibration of the machine.

Preferably, the marks are grouped into clusters on the medium. Each cluster represents a set of nominal locations that span part of the height of the working area. The size of the cluster should be small enough to be recorded by a camera. Advantageously, the cluster of marks is recorded in one shot using a two-dimensional camera, or by a translation scan using a one-dimensional camera. The grouping into clusters allows, for example, characterizing the machine by placing a set of fixed cameras downstream from the working area. The set of cameras can scan the processed medium while the medium is being moved by the conveyor system of the machine (the same system that is used to move the medium while processing it with the laser).

Preferably, the stroke width is measured from the mark recorded by the camera. The stroke width may be used to characterize (or calibrate) the focus of the laser beam.

Preferably, the color value of the stroke is measured from the mark recorded by the camera. The color may be used to characterize (or calibrate) the laser beam power, and whether the laser beam has cut completely through the medium. By color we mean the intensity value recorded by the camera, in one or more dimensions. For example, it may be the greyscale value or the Red-Green-Blue value.

The invention is also about a method to characterize (or calibrate) a laser processing machine comprising two (or more) laser sources with overlapping working areas. The marks are processed in the overlapping zone of the working areas to register the two laser sources into a common coordinate frame. The use of several laser sources allows processing wider mediums.

Once the calibration is performed, the calibration is applied on the machine such that the processing location match the nominal location when the laser is applied on the next media processed by the machine.

When a characterization is performed without calibration, the characterization may show that the processing performed by the machine is still within specification. It may also show that the machine may soon need some servicing if the characterization shows that the machine is close to be out of specification. It may also generate an error if the characterization is out of specification.

The invention is also about a laser processing machine implementing the above mentioned methods. The laser processing machine comprises a conveyor system to translate a medium across a working area. The conveyor system may, for example be a conveyor belt. The machine also has a laser system to process the medium. The laser system is able to process the medium while the medium is moved by the conveyor system.

Further details about the invention are described in the dependent claims.

BRIEF DESCRIPTION OF THE FIGURES

Embodiments of the present invention are illustrated by way of example in the accompanying drawings in which reference numbers indicate the same or similar elements and in which.

DETAILED DESCRIPTION OF THE INVENTION AND OF SOME OF ITS EMBODIMENTS

Figure 1:
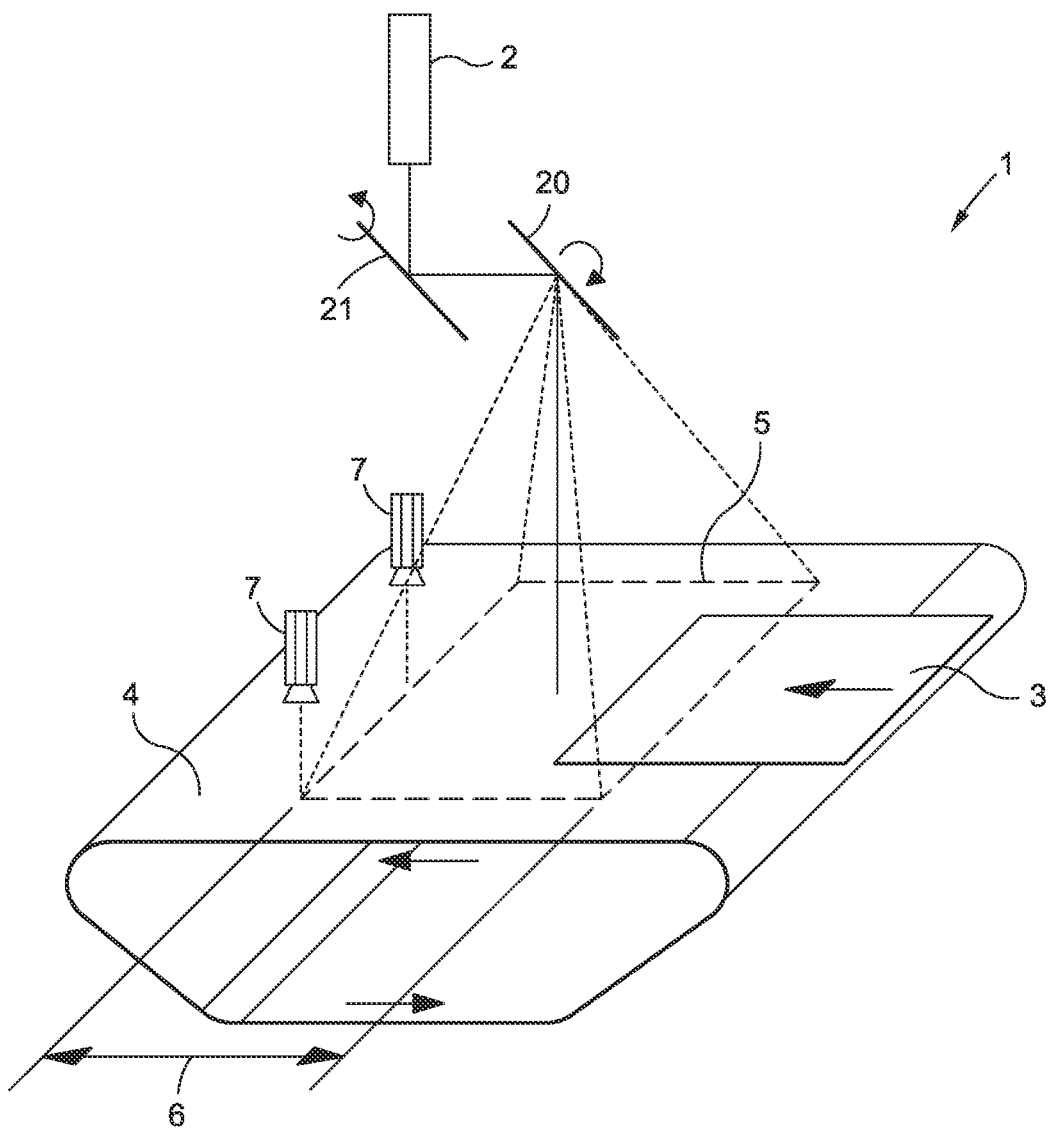
FIG. 1 shows a principled view of the laser processing machine.

FIG. 1 shows an example of a machine 1 according to the invention. The machine of FIG. 1 comprises a laser 2, which is directed, thanks to mirrors 20 and 21, toward a working area 5. The processing of the medium 3 occurs in the working area 5. The processing can be a marking, a cut or a creasing operation. The medium is made of any material compatible with laser processing, for example, paper, cardboard, wood, metal, plastic, glass, leather, laminated substrates, etc. The medium is transported by the conveyor belt 4, and/or by a set of rollers if it comes in web form. Preferably, the medium is transported at constant speed while being processed by the laser. The medium moves along the height 6 of the working area. Several cameras 7 (only two are shown) are placed at the exit of the working area, positioned and oriented so as to record a set of marks that the laser is processing during a calibration operation. The conveyor belt can be used to transport the medium toward the field of view of the cameras at the exit of the working area.

For machines like the one in FIG. 1, the focus of the laser may need to be adapted depending on the processing location, since the distance between the medium and the laser varies within the working area.

Figure 2A:
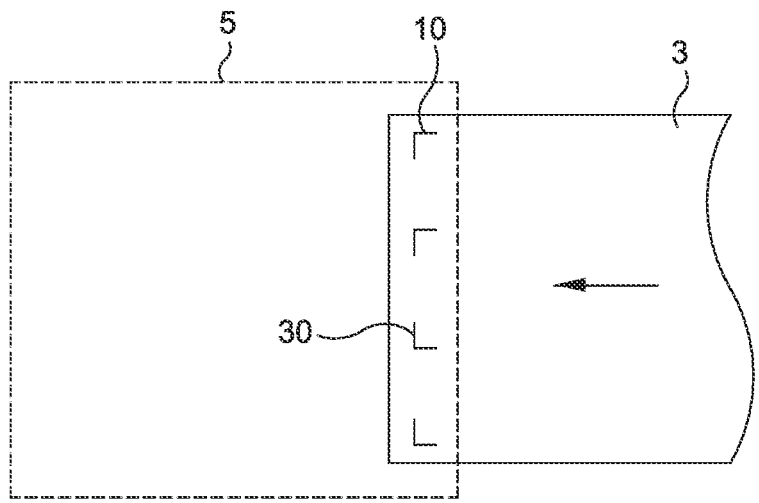
FIGS. 2A through 2D show a medium being processed by the laser while moving through the working area of the laser processing machine.
Figure 2B:
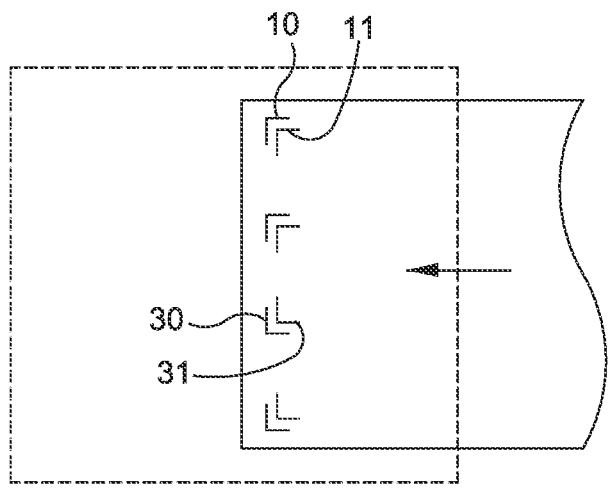
Figure 2C:
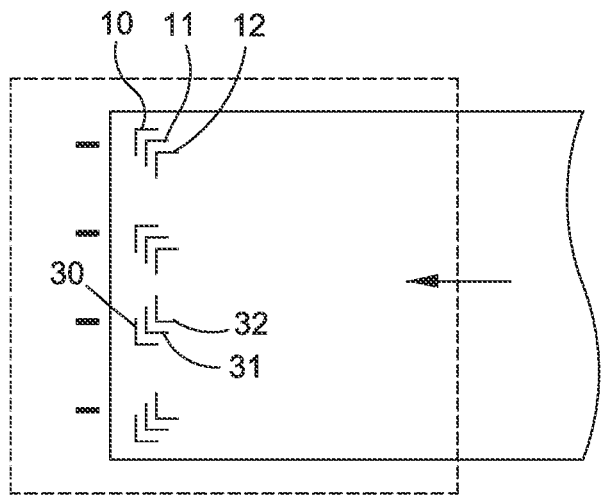
Figure 2D:
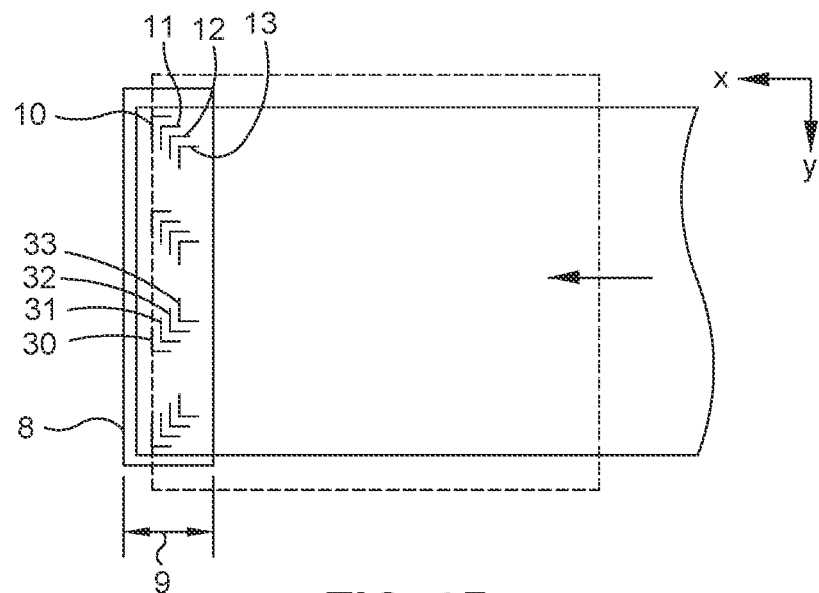

The characterization of the laser processing machine is better explained using FIGS. 2A through 2D. FIGS. 2A through 2D represent a snapshot of a medium 3 travelling through the working area 5 while being processed by the laser. In FIG. 2A, the laser processes a series of calibration marks 10,30. FIG. 2B shows the same medium a few seconds later, advancing a little further in the working area, where the laser processes a second series of calibration marks 11,31. FIG. 2C shows the same medium a few seconds later, advancing a little further in the working area, where the laser processes a third series of calibration marks 12,32. FIG. 2D shows the same medium a few seconds later, reaching the end of the working area, where the laser processes a fourth series of calibration marks 13,33. In this example, all the calibration marks are contained within the rectangular area 8, whose height 9 (and surface) is smaller than the height 6 (and surface, respectively) of the working area. Typically, the height of the rectangular are may be 10 to 100 times smaller than the height of the working area.

Please note that the working area need not be rectangular (i.e. with straight edges). The working area is comprised within the Field of View of the laser scanner. The working area could be the field of view itself. Please also note that the medium may be wider or may be narrower (or of equal width) than the working area. Characterizing the machine is about measuring its accuracy. Calibration is about using the measurement issued from to characterization to correct the behavior of the machine. Please note that we may characterize the machine by (only) measuring the clusters of marks. Comparing this cluster of marks with the theoretical cluster (obtained according to the nominal input values) allows for checking if the machine is still working within specification, without necessarily having to compute back the location of the marks in the working area.

Preferably, the span of the marks on the medium is smaller than the span of their respective processing locations in the working area. In other words, if one would draw a first rectangle that tightly covers the marks on the medium, and a second rectangle that tightly covers the set of their respective location where the processing occurred (in the working area), the first rectangle would be smaller than the second.

Please note that one could choose to process the marks at the front and in the back of the medium, in which case we would segment the marks into two groups, the first group with the marks at the front of the medium, the second group with the marks at the back of the medium, and measure the span as the sum of the span of two rectangles: one for the front of the medium, and one for the back. We would then compare the sum of their areas on the medium with the sum of their corresponding rectangles in the working area.

One of the key aspects of the invention is to position the marks in the medium in a convenient set of locations (which may be job dependent) while sufficiently covering the working area to perform the calibration to the specifications. We prefer solutions where at least some grouping of the mark occurs (i.e. there are at least two marks whose processing locations are spread apart in the working area and which are grouped on the medium).

Figure 3:
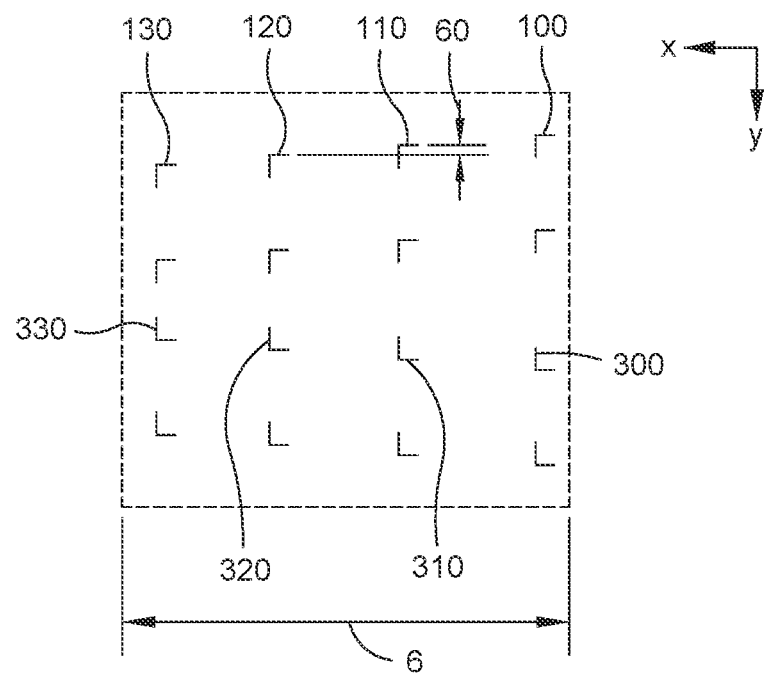
FIG. 3 shows the processing locations, in the working area coordinate frame, of the marks shown in FIG. 2.

FIG. 3 shows the processing positions in the working area coordinate frame. These positions correspond to the marks of FIG. 2. The positions 100,110,120 and 130 correspond to marks 10,11,12 and 13 respectively. The positions 100,110, 120 and 130 correspond to marks 10,11,12 and 13 respectively. Thus, the span of the marks in the medium coordinate frame is smaller than the span of the marks in the working area coordinate frame. It allows reducing the waste and performing the calibration while in production, by choosing the location of the marks (in the medium coordinate frame) to be in the part of the medium that is meant to be trashed. Also the marks are grouped into clusters to ease the recording.

As shown in FIG. 2, to calibrate or characterize the machine, the method moves a medium along the height of the working area of the machine, processes a set of marks on the medium with the laser according to a set of nominal locations. By continuing transporting the medium outside of the working are, a camera may record the marks. The process of marking (processing) the medium is synchronized with the motion of the medium. The marks are spread on the medium such that each recorded mark can be traced back to the location where it was processed. In practice, the nominal locations are chosen such that, if everything was perfectly calibrated, the marks are spread apart on the medium by a margin 60, 61, which is chosen according to the expected positioning noise (of the marking added to the one of the conveyor) and to the required minimal distance for a camera to distinguish two marks. In practice, the marks are shifted or scaled by small amounts 60,61. The marks can be L-shaped, be simple spots, crosses, circles, polygons, etc. The marks shown in FIG. 2 are drawn (processed) in sequence by the laser without any delay between the marks, column-wise. In other words, some marks (one mark in each cluster) are aligned along substantially the same column (or Y coordinate).

The sequence and method of drawing calibration marks may be split into sections and inserted in the normal sequence of laser processing so that the laser system may process the substrate normally between the instants where the marks are processed.

To calibrate the laser processing machine, the method computes back the processing location of each individual mark (in the working area coordinate frame) from its camera reading and from the motion of the medium (and from the exact time at which it was processed). This results in a set of processing locations that are compared to their respective nominal locations, resulting in a set of error vectors for each nominal location. Please note that additional parameters can be used, for example the laser focus, resulting in a multi-dimensional calibration (here a three dimensional error vector). The error for any input location may be obtained by interpolation, resulting in a forward transfer function, defined for every point of the working area. This function can be inverted, resulting in an inverted transfer function, which gives a correction vector to apply to any nominal input. With the correction, the processed output matches the nominal input. The calibration of the machine is the set of correction vectors. It may also be the correction function given any input to the machine. The calibration is geometric if the set of correction vectors is two dimensional, or if the correction functions has two dimensions (in input and output); the two dimensions represent geometric coordinates.

Figure 6A:
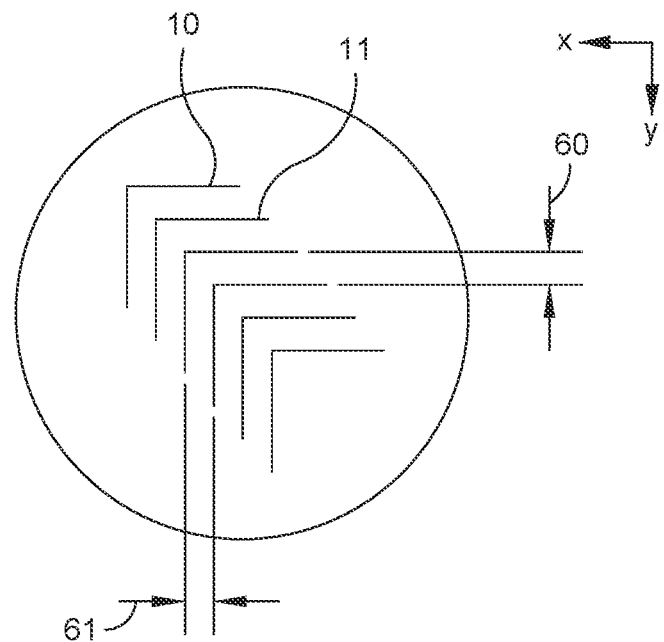
FIGS. 6A and 6B show example of marks for a calibrated and an uncalibrated system, respectively.
Figure 6B:
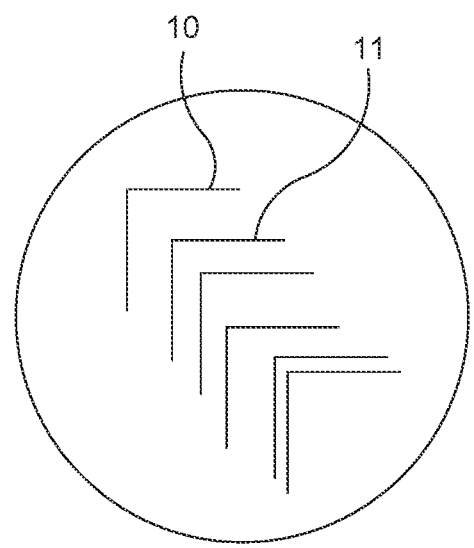

FIG. 6A shows an example where the marks are processed by a calibrated system, i.e. with the nominal location equal to the processing location. It results in a set of regularly shifted marks (the marks do not need to be regularly spaced). FIG. 6B shows an example of an uncalibrated system using the same nominal locations that in FIG. 6A but where, due to the system imperfections, the (processing) position of each mark deviates from its desired (nominal) position. The distance 60,61 between the marks is chosen such that the probability that the marks processed by an uncalibrated system (like the one in shown in FIG. 6B) overlap is close to zero.

The power can be measured by measuring the color of the mark, or by measuring whether the mark was cut through the medium, or partially through the medium. By power we mean the amount of energy delivered by unit of length of the laser stroke. Thus, it is related to the output power of the laser, to the pulse duration and to the speed of processing.

The focus may be measured by measuring the width of the laser stroke.

Figure 4A:
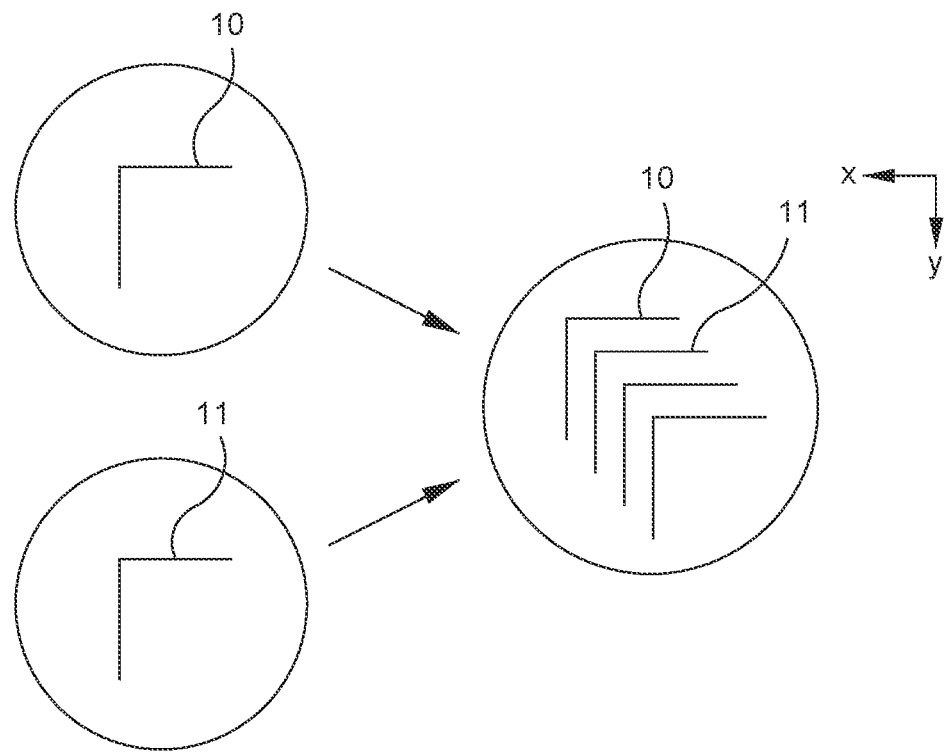
FIGS. 4A through 4E show examples of marks. The left shows individual marks, and the right shows a cluster of four of these marks.

Preferably, the marks are grouped into clusters on the medium. FIG. 4A through 4E show examples of such clusters using different basic shapes. FIG. 4A shows an L-shaped mark. For example, mark 10 corresponds to the nominal location 100 in FIG. 3, mark 11 to nominal location 110 in FIG. 3 (the same holds for FIGS. 4B through 4E). The cluster of marks is shown on the right of the figure. Each marks must be slightly shifted according to the X and Y direction. As a convention the X direction is aligned with the horizontal direction of the figure (and with the height of the viewing area), while the Y direction is perpendicular to the X direction.

Figure 4B:
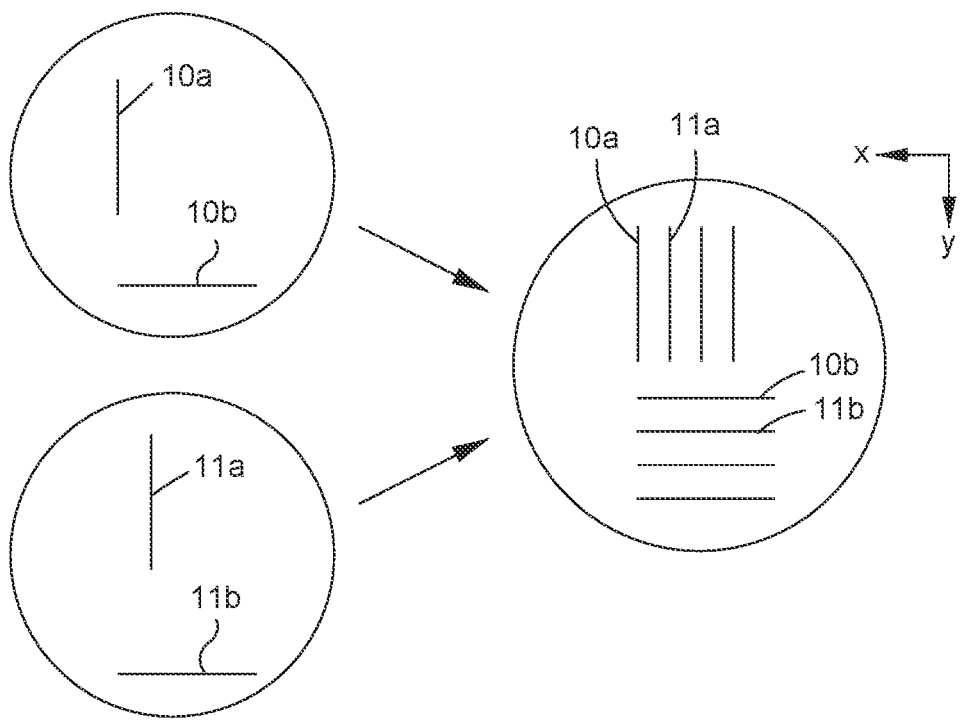

FIG. 4B shows a mark where the X and Y coordinates measurement are decoupled. Mark 10 is made of sub-marks 10a and 10b, respectively. Each sub-mark (10a, 10b) is shifted differently to form the cluster shown on the right of the figure.

Figure 4C:
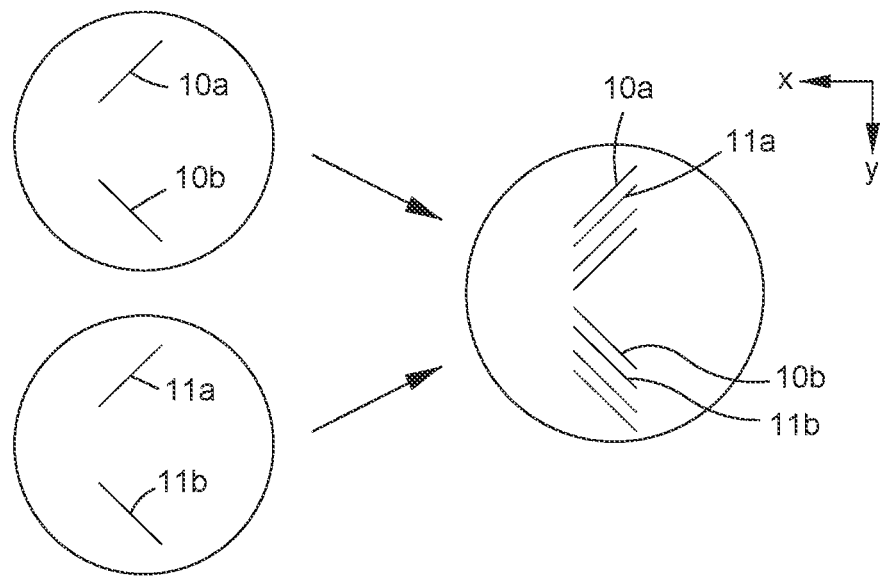
Figure 4D:
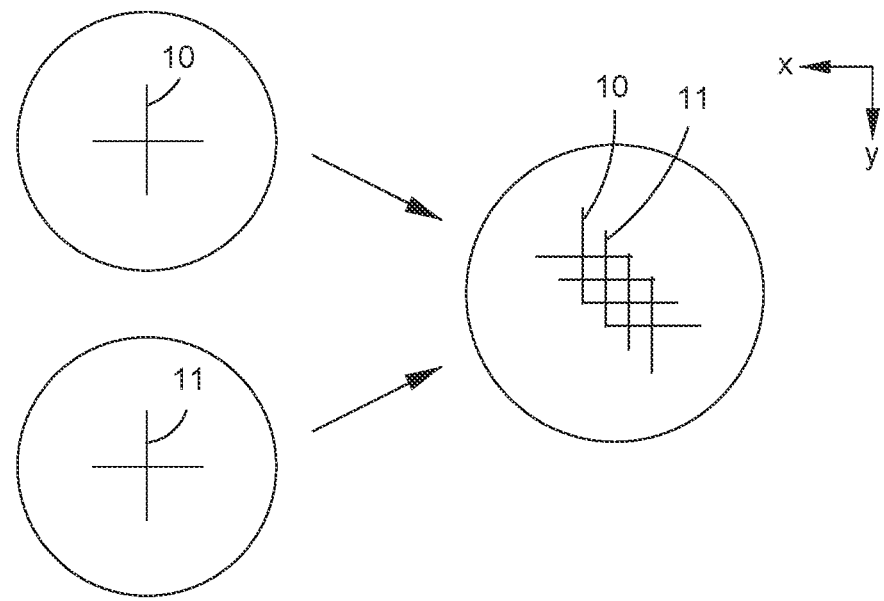

FIG. 4C shows an example of a mark that only needs to be shifted according to the Y direction to form a cluster.

Figure 4E:
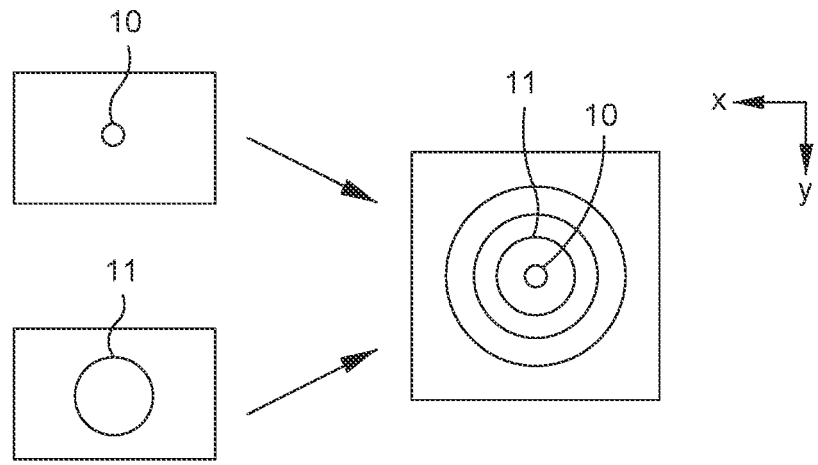

FIG. 4E shown a circular mark, where the size of the circle is varied, but where the marks are at fixed location to form the cluster.

Many alternatives can be used to measure a cluster of marks. For example, several fixed cameras can be placed downstream from the working are so that each cluster of marks travels under a camera thanks to the conveyor system. By fixed camera, we mean a camera that does not move during the processing of the mediums and during the execution of the method according to the invention (but might be displaced in-between processing jobs). The cameras of said example are preferably two-dimensional cameras, but could also be line cameras, with the line of pixels oriented transverse from the motion of the medium.

Alternatively, a single camera mounted on a linear displacement guide can be used. The displacement is performed transverse from the direction of motion (i.e. along the Y direction) to scan all the clusters of marks. Also, the displacement guide must have a system to measure the position of the camera to determine the spatial relationship between the clusters of marks.

Alternatively, instead of moving the camera, we may move the medium according to said transverse direction.

Figure 5:
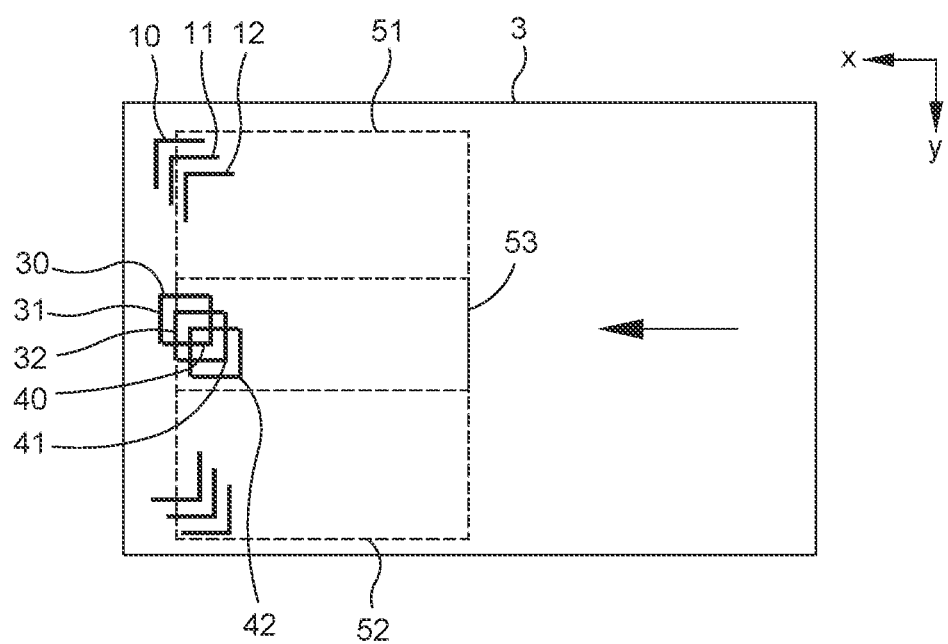
FIG. 5 shows a medium processed on a machine with two lasers and an overlap zone.

The invention is also about a method to characterize (and calibrate) a laser processing machine comprising two (or more) laser sources with overlapping working areas (51,52), where marks (30,32,32,40,41,42) are processed in the overlapping zone 53 of the working areas to register the laser sources into a common coordinate frame, as shown in FIG. 5. The use of several laser sources allows the processing of wider mediums. If there is a one to one relationship between, on the one hand, the marks on the medium and, on the other hand, the processing location and the laser ID, the calibration of the whole system can be performed by applying the calibration method individually to each laser sub-system. The coordinate frame of the working area needs to be common for all the lasers.

For example, a typical system will have 2 to 4 laser sources. Nevertheless, the method works for an arbitrary number of laser sources.

Some definition used throughout this disclosure:

Nominal location: location in the working area coordinate frame, where the processing of the mark would occur if the laser machine was perfectly calibrated.

Processing location: location in the working area coordinate frame where the processing of the mark occurs in practice.

By "Processing" with the laser, we mean any operation of the laser that permanently affect the medium, for example marking, cutting or creasing.

By "laser beam position", we mean the X-Y position of the laser beam if the laser is positioned by transporting the laser source on an X-Y translation table. By "laser beam position" we mean the two dimensional laser beam orientation if the laser is controlled by deviating the laser beam along two dimensions by using one or two inclinable mirrors. By "laser beam position" we mean both the X-Y position and the two dimensional orientation of the beam if the laser can be moved along the X-Y dimensions and oriented using two mirrors. By "mark" we mean a reference mark whose shape is designed for being easily identified and located in an image.

By two dimensional camera we mean a standard camera like the ones found in our phones today. In other words, a camera whose sensor is two dimensional. A standard color camera is considered as a two dimensional camera according to this definition, even if each color pixel output by the camera is three dimensional (red, green and blue components). An example of a camera which is NOT two dimensional is a line camera, which outputs only one line of an image per exposure.

Remark: In the claims, to avoid the ambiguity related to the use of the English word "or", we use the "OR" operator in capital letter to designate the logic OR operation. The logic OR operation returns true if any of its inputs are true. If all of the inputs are false, the output is also false.

The invention claimed is:

1. A characterization method, for characterizing a laser processing machine having a working area and a laser system configured to direct a laser beam in any location of the working area to process a medium, the characterization method comprising:
    moving the medium along a height of the working area using a conveyor system of the laser processing machine;
    processing a set of marks on the medium with the laser system of the machine according to a set of nominal locations in the working area;
    synchronizing the conveyor system with a location of the laser beam to spread the marks on the medium, wherein each mark can be respectively associated with a processing location in the working area where the mark was processed; and
    recording each individual mark on the medium using a camera,
    wherein the set of marks is located in a rectangular area of the medium having a surface smaller than a surface of a smallest rectangular area covering a set of the processing locations in the working area, and
    wherein the marks are grouped into clusters, each cluster covering an area of the medium small enough to be captured by a two-dimensional camera with a single picture and wherein the processing locations of the marks within a cluster span of at least half of a height of the smallest rectangular area covering the set of the processing locations in the working area.

2. The characterization method according to claim 1, wherein a span of the marks on the medium is smaller than a span of respective processing locations of the marks in the working area.

3. The characterization method according to claim 1, wherein a height of the rectangular area on the medium is at least ten times smaller than the height of the working area.

4. The characterization method according to claim 1,
    wherein the marks are segmented into a first group of marks and a second group of marks, and
    wherein a span of the first group of marks on the medium added to the span of the second groups of marks on the medium is smaller than the span of the processing locations of the first group of marks in the working area added to the span of the processing locations of the second group of marks in the working area.

5. The characterization method according to claim 1, wherein the medium includes a layout comprising one or more areas of waste, wherein all the marks are located on the one or more areas of waste on the medium.

6. The characterization method according to claim 1, wherein the laser system includes a power control and a controllable focusing system, wherein a stroke width or a color is recorded by the camera to measure a focus or a power of the laser beam, respectively.

7. A calibration method comprising the characterization method according to claim 1, further comprising:
    for each individual mark:
        from a position of the mark on the medium and based on a motion of the medium, computing the processing location of the mark,
        comparing the processing location with a respective nominal location; and computing a geometric calibration using the processing locations and the nominal locations.

8. The calibration method according to claim 7, wherein the laser system includes a power control and a controllable focusing system,
   wherein a stroke width or a color is recorded by the camera to measure a focus or a power of the laser beam, respectively, and
   wherein the focus OR the power of the laser beam is added to the geometric calibration of the laser processing machine.

9. The calibration method according to claim 8, wherein the laser processing machine includes a first and a second laser source having overlapping working areas,
   wherein the characterization method is applied with the first laser source and applied with the second laser source on the medium,
   wherein a span of marks stemming from the first laser source overlaps with a span of marks stemming from the second laser source, and
   wherein the geometric calibration is performed in a common reference frame for the first and second laser sources.

10. A laser processing machine comprising:
    a conveyor system to translate a medium across a working area; and
    a laser system configured to direct a laser beam in any location of the working area to process the medium,
    wherein the laser processing machine is configured to process the medium while the medium is moving, and
    wherein the laser processing machine is configured to execute the characterization method according to claim 1.

11. A characterization method, for characterizing a laser processing machine having a working area and a laser system configured to direct a laser beam in any location of the working area to process a medium, the characterization method comprising:
    moving the medium along a height of the working area using a conveyor system of the laser processing machine;
    processing a set of marks on the medium with the laser system of the machine according to a set of nominal locations in the working area;
    synchronizing the conveyor system with a location of the laser beam to spread the marks on the medium, wherein each mark can be respectively associated with a processing location in the working area where the mark was processed; and
    recording each individual mark on the medium using a camera,
    wherein the laser processing machine includes a first and a second laser source having overlapping working areas,
    wherein the characterization method is applied with the first laser source and applied with the second laser source on the medium, and
    wherein a span of marks stemming from the first laser source overlaps with a span of marks stemming from the second laser source.

12. A laser processing machine comprising:
    a conveyor system to translate a medium across a working area; and
    a laser system configured to direct a laser beam in any location of the working area to process the medium,
    wherein the laser processing machine is configured to process the medium while the medium is moving, and
    wherein the laser processing machine is configured to execute a characterization method, the characterization method comprising:
       moving the medium along a height of the working area using a conveyor system of the laser processing machine;
       processing a set of marks on the medium with the laser system of the machine according to a set of nominal locations in the working area;
       synchronizing the conveyor system with a location of the laser beam to spread the marks on the medium, wherein each mark can be respectively associated with a processing location in the working area where the mark was processed; and
       recording each individual mark on the medium using a camera;
    a mirror to steer the laser beam toward the working area at a steering angle, and
    a controllable focusing system to focus the laser beam at a predetermined distance as a function of the steering angle,
    wherein the laser processing machine includes a first and a second laser source having overlapping working areas, and
    wherein a span of marks stemming from the first laser source overlaps with a span of marks stemming from the second laser source.

* * * * *